No. 736,414. PATENTED AUG. 18, 1903.
P. W. LITCHFIELD.
PNEUMATIC TIRE.
APPLICATION FILED APR. 24, 1902.
NO MODEL.
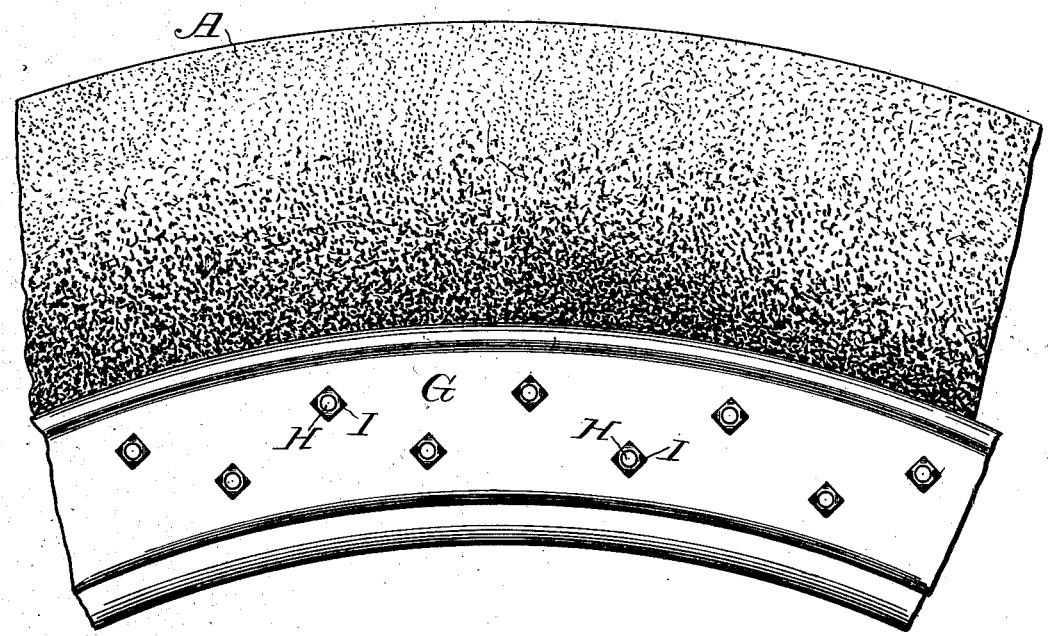
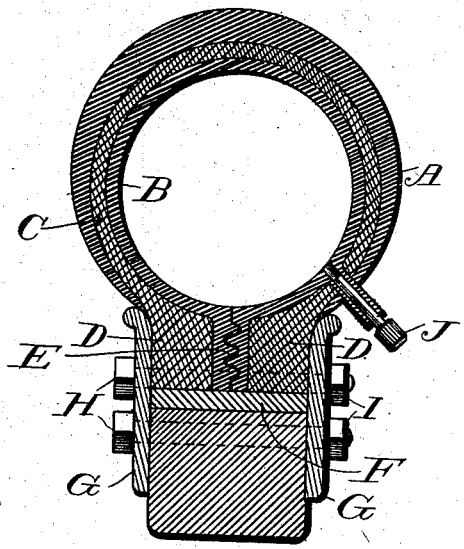
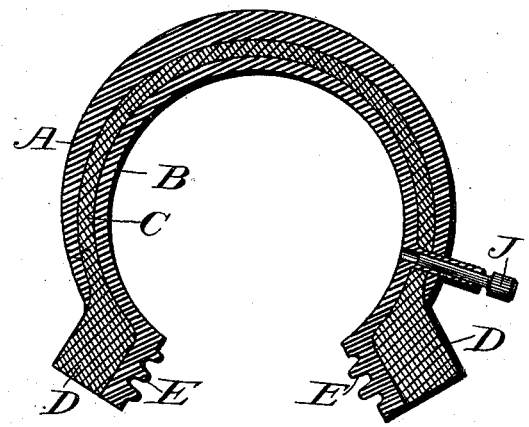
Witnesses
C. H. Walker
J. T. Walker
Inventor
Paul W. Litchfield
By James W. Bevans
Attorney No. 736,414.

Patented August 18, 1903.

UNITED STATES PATENT OFFICE.

PAUL W. LITCHFIELD, OF AKRON, OHIO.

PNEUMATIC TIRE.

SPECIFICATION forming part of Letters Patent No. 736,414, dated August 18, 1903.

Application filed April 24, 1902. Serial No. 104,544. (No model.)

*To all whom it may concern:*

Be it known that I, PAUL W. LITCHFIELD, a citizen of the United States, residing at Akron, in the county of Summit and State of Ohio, have invented a new and useful Pneumatic Tire; and I do hereby declare the following to be a full, clear, and exact description of the invention, such as will enable others skilled in the art to which it appertains to make and use the same.

This invention relates to improvements in pneumatic tires; and the object is to provide an improved construction of pneumatic tire of the type known as "single-tube" tires, which may be readily attached to and removed from the rim of the wheel and when removed may be opened about a portion of or its entire inner periphery, but when in position on the rim will be absolutely air-tight.

With the above objects in view the invention consists in the novel features of construction hereinafter fully described, particularly pointed out in the claims, and clearly illustrated by the accompanying drawings, in which—

Figure 1 is a side elevation of a portion of a rim with my improved tire attached thereto; Fig. 2, a transverse sectional view of the same, and Fig. 3 a similar view of the tire removed from the rim and opened at its inner periphery.

Pneumatic tires as now constructed may be divided into two classes, to wit: First, the single-tube tire, consisting of an annular casing and an inner air-holding chamber, the walls of which are vulcanized to the casing. In this tire the only access to the air-chamber is through the valve. Second, the double-tube tire, which consists of an outer casing or shoe and a separate inner tube for holding the air.

In my present invention I provide a detachable tire in which the casing or shoe and the air-holding material are united in one piece either by cementing or vulcanizing the two together, and so construct the tire that it may be opened about a portion of or its entire inner periphery when removed from the rim, but at the same time capable when in position upon said rim of being made air-tight by mechanical compression.

Referring now more particularly to the drawings, A designates the outer wearing-surface of the tire, formed, preferably, of rubber; B, the inner lining, also of rubber or other suitable air-proof material, and C a layer of fabric interposed between the inner and outer layers A and B, all three layers being united by cementing or vulcanizing to form a single tube. This tube is formed with an enlarged base D, cut centrally inward through the inner wall of the tire, the meeting faces of said cut portion having the corrugations E, adapted to interlock when said base is compressed. Said base D is greater in width than the width of the rim, so that it is greatly compressed when the means hereinafter described is applied, and consequently a tight joint is formed, preventing any escape of air from the interior of the tire. While I have shown and described base D as having interlocking faces at its cut portion, said faces may be made smooth and a tight joint still formed.

The rim is provided on its periphery with a flat metal tire or plate F, forming a seating-surface for the base of the pneumatic tire, which is positioned thereon and detachably secured to the rim by flanges or plates G, attached to the respective sides of the rim and projecting beyond the metallic tire F a distance equal to the transverse extent of the base D, said base being confined and compressed therebetween. Said flanges are removably secured to the rim by bolts and nuts H I, some of said bolts passing through the rim and others through the enlarged base D of the tire.

It will be seen that by removing one of the flanges or plates G the tire may be detached from the rim and that when removed it may be opened about its inner periphery, so that access may be had to the interior thereof. The tire may be so constructed as to be opened about either its entire inner periphery or only a portion thereof, as may be preferred, and means may be employed to secure the tire in position upon the rim and to effect a compression thereof at the joint other than that here shown and described without departing from the spirit and scope of my invention, which consists, broadly, in providing a single-tube pneumatic tire open at a portion of or at its entire inner periphery and means for closing said opening and forming an air-tight joint.

The tire is provided with a valve J, which may be of any preferred construction and located at any desired point.

Having thus fully described my invention, what I claim as new, and desire to secure by Letters Patent of the United States, is—

1. A pneumatic tire having its inner periphery enlarged to form a base of greater width than the width of the rim to which it is to be applied and having said base cut inwardly through the inner wall of the tire, in combination with securing-flanges attached to the rim on each side of the base of the tire for compressing said base to form an air-tight joint at said cut portion.

2. A pneumatic tire having its inner periphery enlarged to form a base of greater width than the width of the rim to which the tire is to be applied and having said base cut inwardly through the inner wall of the tire and having the meeting faces of said cut portion formed with interlocking portions, in combination with securing-flanges attached to the rim on each side of the base of the tire for compressing said base to form an air-tight joint at said cut portions.

In testimony whereof I hereunto affix my signature in the presence of two witnesses.

PAUL W. LITCHFIELD.

Witnesses:
H. C. PARSONS,
C. L. SMITH.